(12) United States Patent
Richardson (10) Patent No.: US 9,294,032 B2
(45) Date of Patent: Mar. 22, 2016

(54) MODULAR ROOF SOLAR PANEL FOR CONVENTIONAL ROOF AND ROOFING INTEGRATION

(71) Applicant: Robert Richardson, Aylmer (CA)

(72) Inventor: Robert Richardson, Aylmer (CA)

( * ) Notice: Subject to any disclaimer, the term of this patent is extended or adjusted under 35 U.S.C. 154(b) by 183 days.

(21) Appl. No.: 14/075,774

(22) Filed: Nov. 8, 2013

(65) Prior Publication Data

US 2015/0129016 A1  May 14, 2015

(51) Int. Cl.
| F24J 2/04 | (2006.01) |
| H02S 20/23 | (2014.01) |
| F24J 2/46 | (2006.01) |

(52) U.S. Cl.
CPC ............... *H02S 20/23* (2014.12); *F24J 2/045* (2013.01); *F24J 2/464* (2013.01); *Y10T 29/49355* (2015.01)

(58) Field of Classification Search
CPC ....... F24J 2/5245; F24J 2/5258; F24J 2/5262; F24J 2/5237; F24J 2002/4667; Y02B 10/12
See application file for complete search history.

(56) References Cited

U.S. PATENT DOCUMENTS

| 4,244,355 | A | | 1/1981 | Stout | |
| 4,273,106 | A | | 6/1981 | Gould | |
| 4,392,484 | A | * | 7/1983 | Aloi et al. | 126/622 |
| 5,338,369 | A | | 8/1994 | Rawlings | |
| 5,571,338 | A | * | 11/1996 | Kadonome et al. | 136/251 |
| 6,063,996 | A | | 5/2000 | Takada et al. | |
| 7,642,449 | B2 | | 1/2010 | Korman et al. | |
| 8,181,402 | B2 | | 5/2012 | Tsuzuki et al. | |
| 8,418,419 | B1 | | 4/2013 | Aseere et al. | |
| 8,793,941 | B2 | * | 8/2014 | Bosler et al. | 52/173.3 |
| 2010/0242381 | A1 | * | 9/2010 | Jenkins | 52/173.3 |
| 2011/0314753 | A1 | * | 12/2011 | Farmer et al. | 52/173.3 |
| 2013/0160382 | A1 | * | 6/2013 | Schick et al. | 52/173.3 |
| 2014/0041321 | A1 | * | 2/2014 | Poivet | 52/173.3 |

FOREIGN PATENT DOCUMENTS

| CA | 1092462 | 12/1980 |
| CA | 2095827 | 5/1992 |
| CA | 2091059 | 11/1992 |

(Continued)

OTHER PUBLICATIONS

International Search Report issued on Jul. 26, 2012 for PCT International Patent Application No. PCT/CA2012/050305.

*Primary Examiner* — Christine T Cajilig
(74) *Attorney, Agent, or Firm* — Heslin Rothenberg Farley & Mesiti P.C.; Victor A. Cardona, Esq.

(57) ABSTRACT

There is provided an improved roof solar panel, embodying a photovoltaic panel mounted on a frame for easy installation onto a conventional sloped roof and integration with conventional roof coverings. Such panel includes a roof covering mounting surface on an outside support of the frame, a photovoltaic panel mounting surface on an inside support of the frame, and when installed on the roof, a retainer trim for securing the roof covering and photovoltaic panel mounted on said supports while mounting to the frame. The frame also serves to provide means for securing the panel onto roof trusses. Integration with the conventional roof covering provides, inter alia, an attractive low profile with improved water shedding, wind resistance, and thermal regulation properties. The invention also relates to a kit comprising, inter alia, said roof solar panel, and to a method of installing said roof solar panel.

19 Claims, 9 Drawing Sheets

(56) References Cited

FOREIGN PATENT DOCUMENTS

| | | |
|---|---|---|
| CA | 2131899 | 7/1994 |
| CA | 2120650 | 10/1994 |
| CA | 2574659 | 2/2006 |
| CA | 2617819 | 9/2008 |
| CA | 2691856 | 12/2008 |
| CA | 2693028 | 1/2009 |
| CA | 2718162 | 5/2009 |
| CA | 2711627 | 7/2009 |
| CA | 2751298 | 8/2010 |
| CA | 2703324 | 12/2010 |
| CA | 2767031 | 1/2011 |
| CA | 2780053 | 5/2011 |
| DE | 9114949 | * 3/1992 |
| DE | 102010023259 A1 | * 11/2011 |
| EP | 0549560 | * 6/1993 |
| EP | 2242112 A2 | * 10/2010 ............ H01L 31/048 |
| FR | 2961299 A1 | * 12/2011 |
| FR | 2962797 A1 | * 1/2012 |
| FR | 2966853 A1 | * 5/2012 |
| WO | WO 2006043658 A1 | * 4/2006 |

\* cited by examiner

STEP #9

STEP #8

STEP #11

STEP #7

STEP #10

MODULAR ROOF SOLAR PANEL FOR CONVENTIONAL ROOF AND ROOFING INTEGRATION

FIELD OF THE INVENTION

The present invention relates to an improved roof solar panel, embodying photovoltaic cells, that can be readily and easily installed into a conventional sloping roof and that integrates with a conventional roof covering so as to provide, inter alia, an attractive low profile with improved water shedding, wind resistance, and thermal regulation properties. Further, the invention relates to a kit comprising, inter alia, said roof solar panel, and to a method of installing said roof solar panel.

BACKGROUND

Both non-structural and structural roof elements incorporating solar collectors such as an array of photovoltaic cells are well known. However, structural roof panels are generally of specialized and costly configuration and installation, often complex and/or heavy and requiring modification or replacement of existing conventional roof structures. The combination of non-structural substrates and solar panels is also well known as substitutes for roofing materials such as shingles and tiles, but such are also typically costly and requiring specialized installation. Solar panels for installation over existing roof components are also well known, but such pose undesirable profile and aesthetic factors, and challenges for mounting securely on the roof without compromising existing roof components or their function.

In addition, as the temperature of a photovoltaic cell increases, its power output drops. As such, it is important to ensure that photovoltaic cells are kept cool to ensure an optimal operating environment.

PCT/CA2012/050305 describes a modular roof solar which is mounted onto conventional modular roof sheathing. This integration reduces the complexity, and cost of incorporating a photovoltaic cell, while still providing a highly secure integration into a conventional roof structure. However, this modular panel is still somewhat heavy, and the roof sheathing acts as an insulator against the back of the photovoltaic cell, increasing the difficulty in maintaining an optimal operating temperature.

There is therefore a need for a low cost, easy to install roof solar panel offering highly secure integration into conventional roof structures and consequent functional and aesthetic advantages while maintaining proper temperature control for the solar panel.

SUMMARY OF THE INVENTION

In a first aspect, the invention provides a modular roof solar panel for installation on a sloping roof, the panel comprising a rigid photovoltaic panel, a rectangular frame and a retainer trim. The frame comprises a width and lower surface respectively configured for mounting of the solar panel on a plurality of adjacent roof trusses, the trusses having construction industry standard separation. In addition, the frame has an inside support, preferably a recessed perimeter ledge, on which the photovoltaic panel is mounted, and an outside support, preferably a recessed perimeter ledge, for mounting of an overlapping part of a roof covering. The frame has a maximum thickness which is about the same as a combined thickness of a roof sheathing and roof covering of an adjacent part of the roof. The retainer trim is mounted on top of the frame and overlapping the photovoltaic panel so as to secure the photovoltaic panel on the inside support, and also overlaps the outside support for securing the overlapping part of the roof covering when the modular roof solar panel is installed on a roof.

In a preferred embodiment the photovoltaic panel is sealingly secured to the inside support using a sealing adhesive, preferably a urethane sealer. Additionally, when the panel is installed on a roof, the retainer trim is preferably sealingly secured to the photovoltaic panel, frame and roof covering using a sealing adhesive, preferably a silicone sealer.

In yet another preferred embodiment, the frame and retainer trim are made of aluminum.

In yet another preferred embodiment, the retainer trim further comprises fasteners for securing the retainer trim to the frame.

In yet another preferred embodiment the solar panel comprises a spacer between the frame and the retainer trim.

In yet another preferred embodiment, the roof covering comprises either shingles or steel roofing.

In a second aspect, the invention provides a kit of parts for the installation of a modular roof solar panel on a sloped roof, the kit comprising the above described solar panel, one or more roof truss braces for providing extra structural support to the panel and roof trusses, mounting hardware for assembling and attaching the panel to the roof trusses and finally, shingle strips for placement in the outside support of the frame during a shingled installation.

In a third aspect, the invention also provides a method for installing the modular roof solar panel described above onto a sloping roof. The method comprises the following steps: selecting an area for mounting the modular roof solar panel; installing mounting spacers on roof trusses around a perimeter of the area; mounting the panel onto the roof trusses of the area; securing the roof covering over the outside support and adjacent mounting spacers; and mounting the retainer trim on the frame, roof covering, and photovoltaic panel.

In a preferred embodiment the method of installation also includes, after installing the mounting spacers, installing roof truss braces between the roof trusses and preparing the roof truss braces for contact with the photovoltaic panel.

SUMMARY OF THE DRAWINGS

In drawings which illustrate preferred embodiments of the invention.

DETAILED DESCRIPTION OF THE INVENTION

There is disclosed herein a prefabricated modular roof solar panel that is configured to be installed onto conventional roof trusses, a kit of parts for the installation, of such a roof solar panel, and a method of installing such roof solar panel. The roof solar panel is described as modular as its width is specifically chosen to allow for easy installation on a roof using construction industry standard size roof trusses at construction industry standard separation. This choice of size reduces the complexity involved in installing the roof solar panel.

Figure 2:
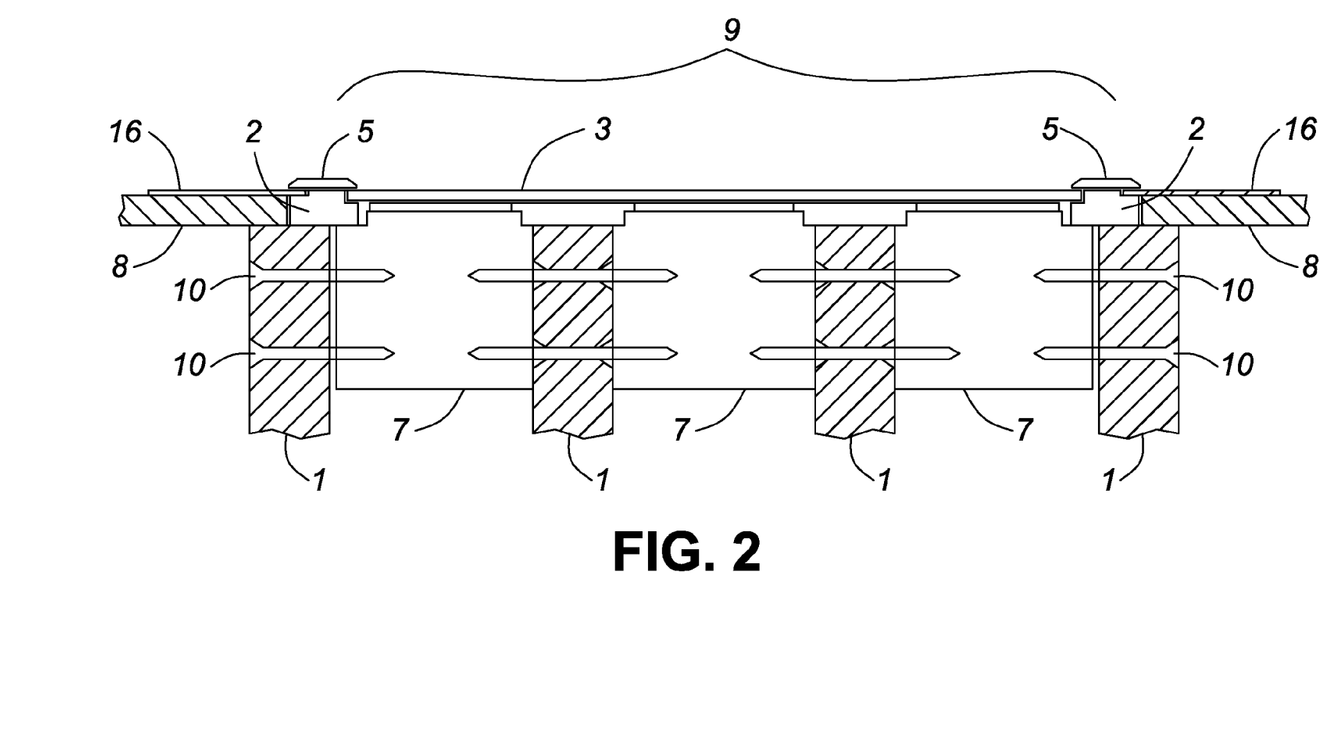
FIG. 2 is a cross section view from side to side of the inventive roof solar panel installed on a roof using steel roofing.
Figure 3:
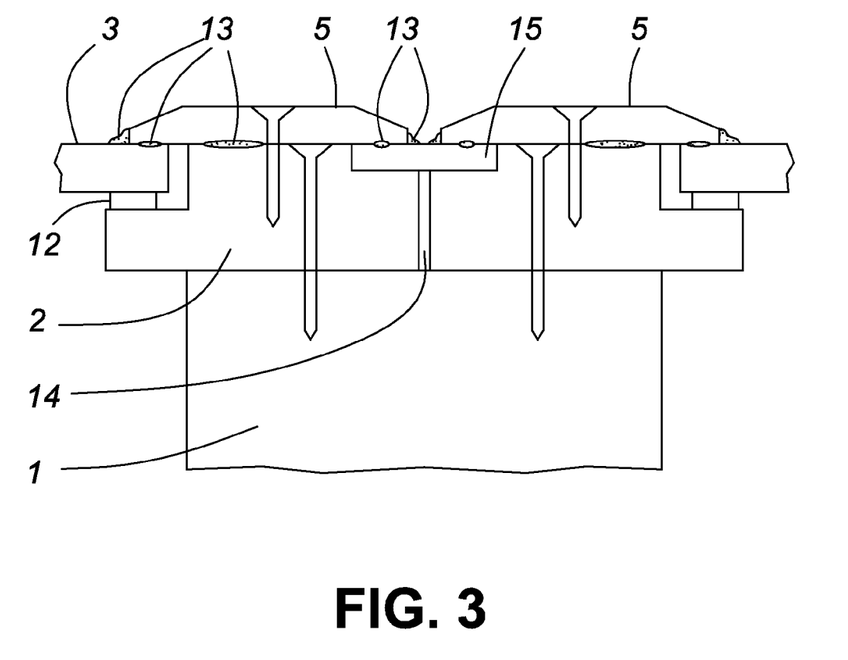
FIG. 3 is a cross section view through abutting sides of a pair of adjacent roof solar panels according to the invention, installed on a roof.

The modular roof solar panel is comprised of a frame, preferably made of aluminum. The frame is preferably rectangular in shape, i.e. with four sides (upper, lower and two lateral sides). Each side of the frame preferably has a width, approximately 30 mm, and a lower surface which, as shown in FIG. 3, is configured to allow for the lateral sides of two adjacent frames to be securely attached, side by side, to a single underlying construction industry standard size roof truss (approximately 3.8 cm (1½") wide) with each lateral side overhanging the edge of the truss. The frame is also configured to have a total width which allows for each lateral side to be attached to a separate roof truss, when the trusses are at an industry standard separation (approximately 40.6 cm center to center (16" center to center)). For example, as shown in FIG. 2, a frame configured to span four roof trusses would attach to the first roof truss at approximately the midpoint of that truss, extend over three truss separations, two trusses, and attach to a fourth roof truss at the midpoint of that truss. While the exemplified values reflect North American construction industry standards, the invention may also be modified for use with a roof built according to different standards or requirements.

The frame has an inside support and an outside support, preferably a recessed inside perimeter ledge and a recessed outside perimeter ledge respectively. The recessed inside perimeter ledge supports a rigid photovoltaic panel comprised of a conventional photovoltaic cell array sealed onto much of its upper surface and covered by a rigid, transparent protective sheet such as glass, plexiglass, or most preferably low iron glass. Such protective sheet is for protecting the array from the usual physical stresses caused by weather (wind, water, snow etc.) and atmospheric debris, while allowing sunlight to pass through to the surface of the photovoltaic array for conversion into electricity. Preferably the photovoltaic panel is mounted to the recessed inside perimeter ledge with a sealing adhesive, preferably urethane. The recessed outside perimeter ledge provides a surface on which a standard roof covering may be mounted, so that it is flush with an adjacent roof sheathing panel which is covered with the same roof covering.

Preferably the roof covering comprises either shingles or steel roofing. Either of these roof coverings may be installed over standard roof sheathing, although steel roofing does allow for some roofs which do not require an underlying layer of sheathing. In such installations, additional strapping would be secured to the trusses adjacent to the frame to provide for an adjacent mounting surface which is flush with the recessed outside perimeter ledge of the frame.

Finally, the roof solar panel comprises a retainer trim, preferably made from aluminum, which is mounted on the frame and overlaps the photovoltaic panel and roof covering so as to secure both when the panel installation is complete.

During installation on a shingled roof, after the modular roof solar panel has been secured to the trusses, a preferably single shingle layer (preferably a shingle strip prepared from a shingle by cutting away a show surface of the shingle) is secured around the top and sides of the aforementioned recessed outside perimeter ledge of the frame. The shingle layer is also sized so that it overlaps onto adjacent regular roof sheathing. Along the lower side of the roof solar panel, shingles are installed so that their upper edges overlap the recessed outside perimeter ledge of the frame, preferably subject to cutting them so as to avoid overlap of the shingle strips at the sides of the roof solar panel near and at the bottom thereof. Sealer (e.g. silicone) is applied over the shingle strips along the sides and top of the roof solar panel, the upper ends of the regular shingles along the bottom of the roof solar panel, and the frame and photovoltaic panel, after which the retainer trim is then mounted. After installation of the retainer trim, conventional shingling of the roof to points abutting the retainer trim at the sides and top, and under the shingle along the bottom of the roof solar panel is performed. During an installation using steel roofing, the steel roofing is similarly secured to the frame following which the retainer trim is attached. With steel roofing there is no need to prepare shingle strips as detailed above.

It is noted that the inventive roof solar panel has the advantage of allowing a solar panel to be quickly and easily installed on a conventional existing roof, or on a new roof construction without the usual time consuming aspects of adapting a solar panel for installation over existing conventional roof panels and coverings. Also, use of familiar materials requires less training, skill and cost for installation compared to other systems.

Figure 1:
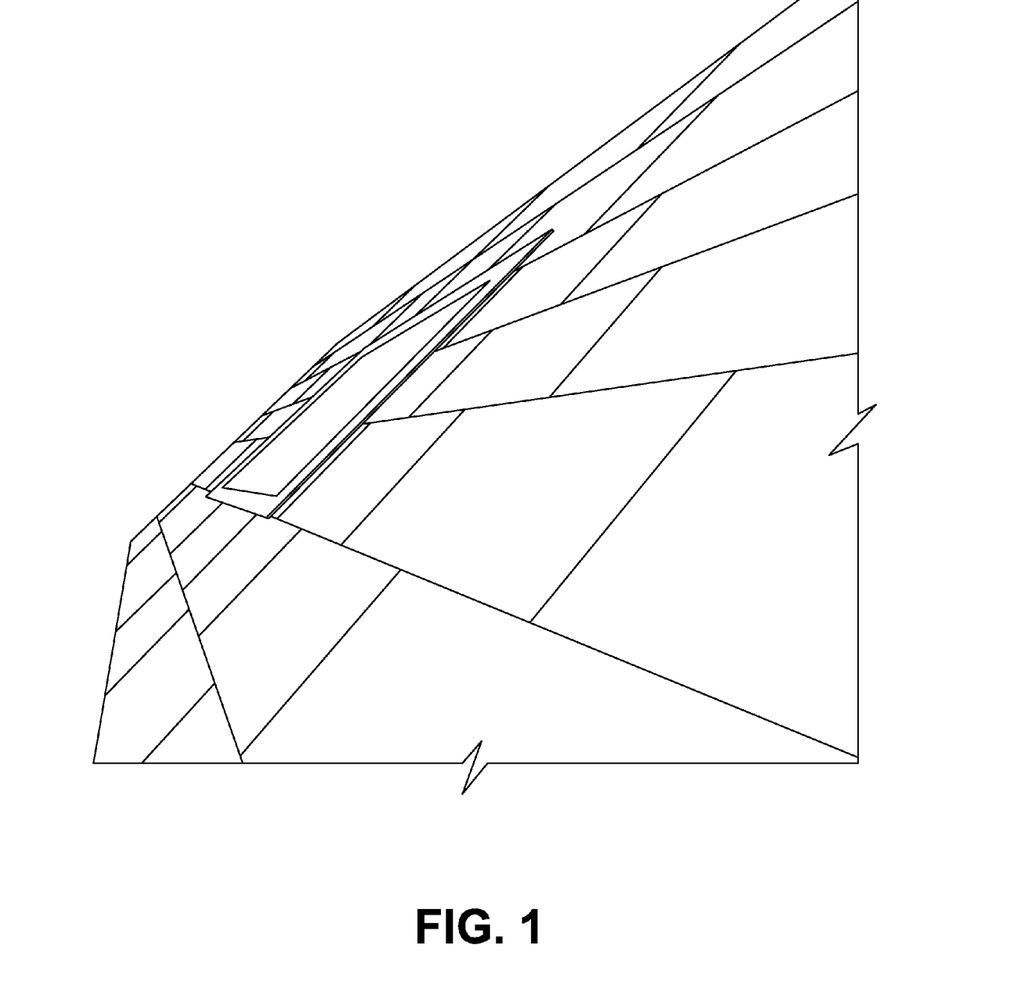
FIG. 1 is a side perspective view of the roof solar panel according to the invention, installed on a roof.

The present invention further does not require mounting brackets and is integrated with the roof covering so as to provide a low profile on the roof (see FIG. 1). Thus, this provides superior water shedding and is less affected by wind compared to higher or more complex profiles. This further provides a more aesthetically pleasing appearance.

Further, by using the inventive solar panel significant weight reductions are achieved compared to prior art systems and solar panels, thereby allowing for easier placement and installation.

The preferred use of urethane as an adhesive allows for a more flexible control over expansion and contraction between the construction materials in the modular roof solar panel.

Finally, since the bottom surface of the photovoltaic panel exposed is to the air inside the roof (in contrast to installation on the surface of a roof), the panel is in contact with a large volume of air allowing for improved temperature regulation of the photovoltaic array.

The modular roof solar panel, its installation on a roof and the kit of parts for installation of the modular roof solar panel will now be described with reference to the Figures.

Figure 1A:
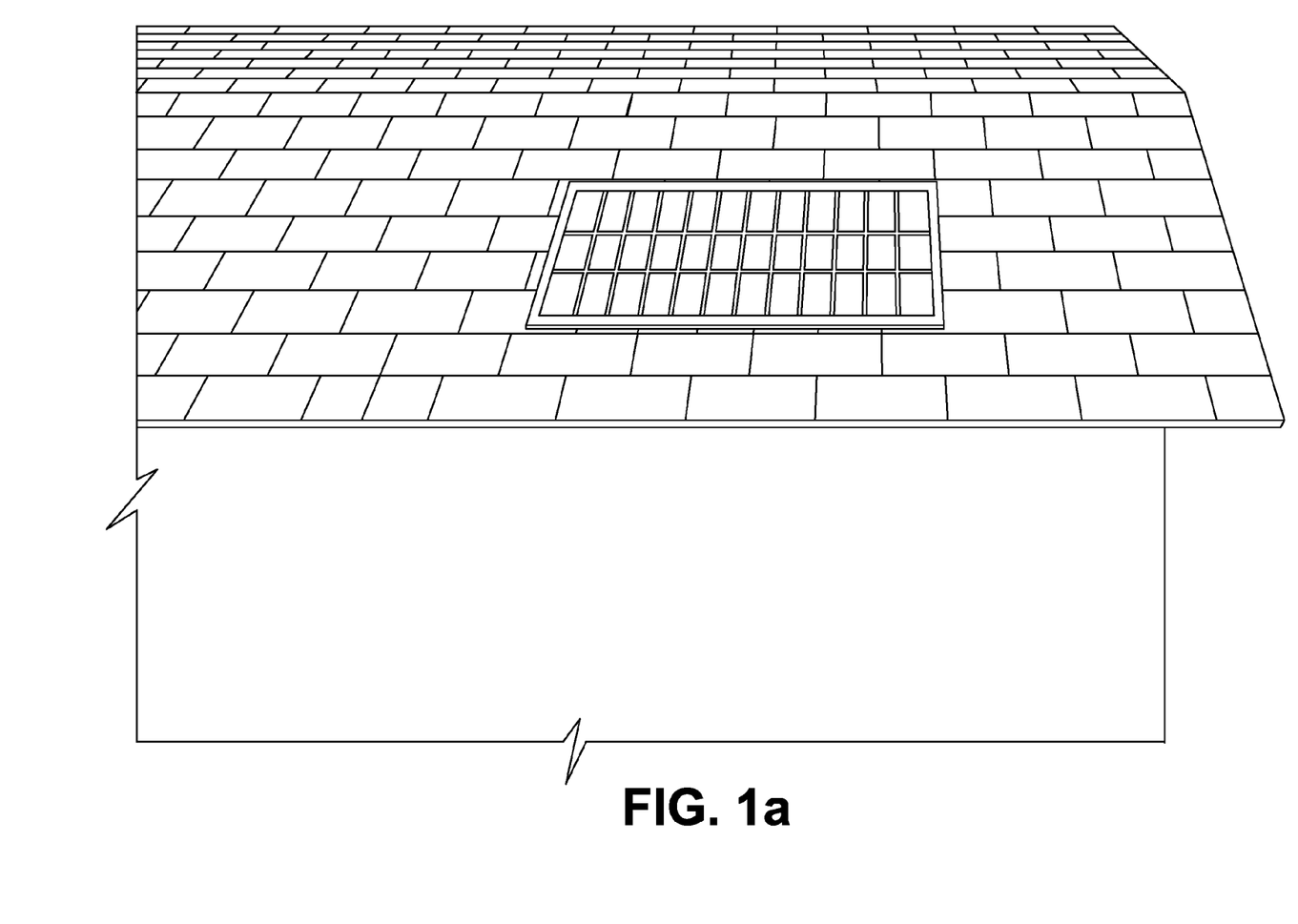
FIG. 1a is a front perspective view of a roof solar panel according to the invention, installed on a roof.

FIGS. 1 and 1a illustrate the inventive roof solar panel installed on a roof. The perspective view of FIG. 1 conveys the low profile of the roof solar panel as well as its integration into the surrounding conventional shingles. While these Figures illustrate a single roof solar panel so installed, two or more inventive roof solar panels may be installed on the roof either separated from or, more preferably, abutting each other.

Figure 2A:
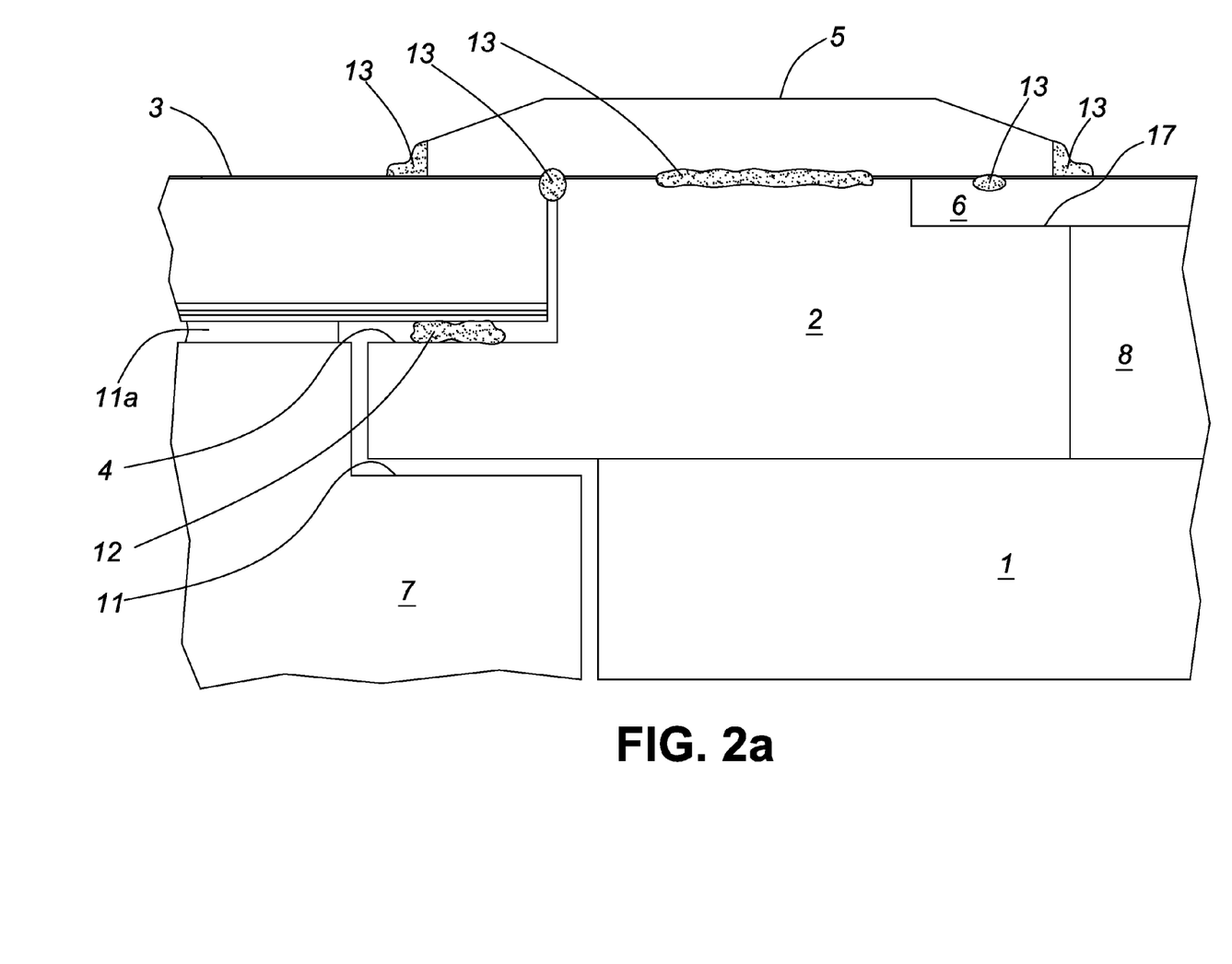
FIG. 2a is a close-up, cross section view of the right side of the inventive solar panel installed on a shingled roof.

FIGS. 2 and 2a illustrate the components of the inventive roof solar panel when installed on a roof. Conventional sheathing 8 and the inventive roof solar panel 9 are mounted on roof trusses 1 using fasteners, e.g. screws. Roof solar panel 9 has photovoltaic panel 3 (having silicon photovoltaic cells and tag wires) mounted on the recessed inside perimeter ledge 4 of the frame 2. Preferably, the photovoltaic panel 3 is sealed to the recessed inside perimeter ledge 4 using sealing adhesive 12. Sealing adhesive 12 is preferably urethane. Wiring of the array is attached to a control box on the underside of the panel (not shown) which may be easily accessed from the area under the roof.

In some embodiments roof truss braces 7 may be installed between the roof trusses 1 using appropriate fasteners 10, preferably screws. The roof truss braces 7 are preferably notched 11 at either end and fitted with a flexible tape 11a to allow for the roof truss braces 7 to support the photovoltaic panel 3 and roof trusses 1 against an increased load, or to conform with local building code requirements. One example of where roof truss braces 7 might be appropriate is for a roof in an area which has a significant snowfall during the winter.

As shown in FIG. 2a, during a shingled installation, shingle strips 6, which preferably are cut from conventional shingles, are mounted during installation of the roof solar panel 9 on the roof, preferably in a single layer on the sides and top of the roof solar panel 9 on the recessed outside perimeter ledge 17 of the frame 2 and over the abutting areas of the adjacent sheathing 8. In contrast, FIG. 2 shows a continuous adjacent roof covering 16, such as steel roofing, overlapping the recessed outside perimeter ledge 17 of the frame 2. Once again referring to the shingled installation shown in FIG. 2a, along the sides and top of the roof solar panel 9, retainer trim 5 is mounted (during installation of the roof solar panel 9 on the roof), on the shingle strips 6, the frame 2, and photovoltaic panel 3. Along the bottom area of the roof solar panel, retainer trim 5 is mounted (also during such installation on the roof) on a conventional shingle 30, the frame 2 and the photovoltaic panel 3 (see FIG. 8a). Preferably, retainer trim 5 is so mounted using sealing adhesive, preferably silicone 13. Also preferably, the retainer trim 5 has fastener openings for installing fasteners, preferably screws, through the retainer trim 5, and into the underlying frame 2 as shown in FIG. 3.

In FIG. 3 there is shown in cross section across abutting sides, a preferred configuration of a pair of adjacent roof solar panels according to the present invention. Thus, instead of a shingle strip 6 or continuous adjacent roof covering 16 covering the joint 14 between the abutting panels (as in FIGS. 2a and 2 respectively), there is a resilient strip 15, preferably water impermeable and preferably made of an acrylic foam, mounted over and along the length of such joint with adhesive sealant. The retainer trim 5 is mounted, when the abutting roof solar panels are being installed on the roof, over such resilient strip 15 in the place of shingle strips 6 or continuous adjacent roof covering 16 along the abutting recessed outside perimeter ledges 17 of each frame 2 (as well as the frames 2, and photovoltaic panels 3 as described above).

Figure 4:
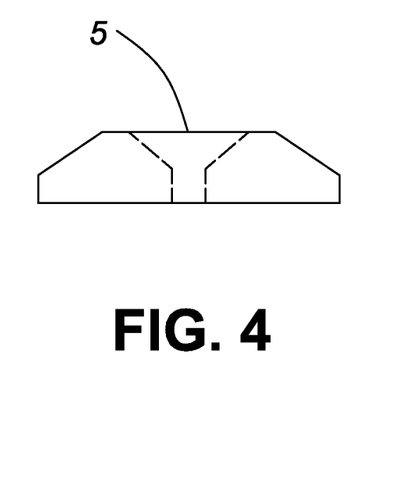
FIG. 4 is a cross section view of a retainer trim component of the invention.

FIG. 4 shows a preferred configuration of the retainer trim 5 for use in the roof solar panel of the present invention. Preferably such retainer trim 5 is made of aluminum. The retainer trim 5 is shown having a height (preferably 3.5 mm tall) and a width (preferably 26.5 mm wide), adapted for sealing engagement with the top of the frame 2, photovoltaic panel 3, and the roof covering (FIGS. 2 and 2a). In one embodiment a spacer (not shown) may be placed between the retainer trim 5 and the frame 2 to provide for a proper engagement when a thicker photovoltaic panel 3 or roof covering is used.

Figure 5:
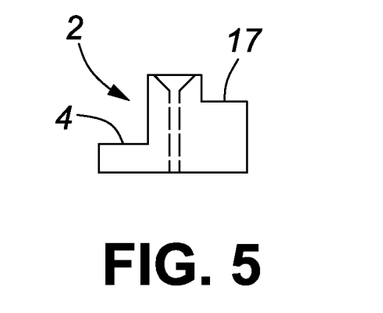
FIG. 5 is a cross section view of the frame component of the invention.

FIG. 5 shows a preferred configuration of the frame 2, which is preferably made of aluminum and is preferably about 30 mm wide and 12 mm high. The recessed inside perimeter ledge 4 is preferably about 8 mm wide and 7 mm high while the recessed outside perimeter ledge 17 is preferably about 7 mm wide and 2 mm high. These preferred dimensions allow for the recessed outside perimeter ledge 17 of the frame 2 to be approximately level with a standard thickness adjacent sheathing 8 (approximately 0.95 cm (3/8")) in order to facilitate the placement and integration of the roof covering which is mounted on the frame 2 with the adjacent roof covering on the adjacent sheathing 8. These values may be adjusted to accommodate integration with other sheathing or roof coverings of other standard, or even non-standard thickness.

Figure 6:
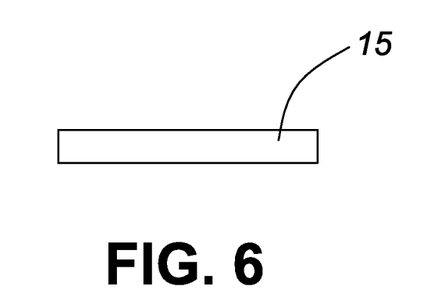
FIG. 6 is a cross section view of an acrylic foam connecting strip component of the invention.

FIG. 6 shows a preferred configuration of the resilient strip 15, preferably of made of an acrylic foam and preferably about 13 mm wide and 2 mm high.

Figure 7:
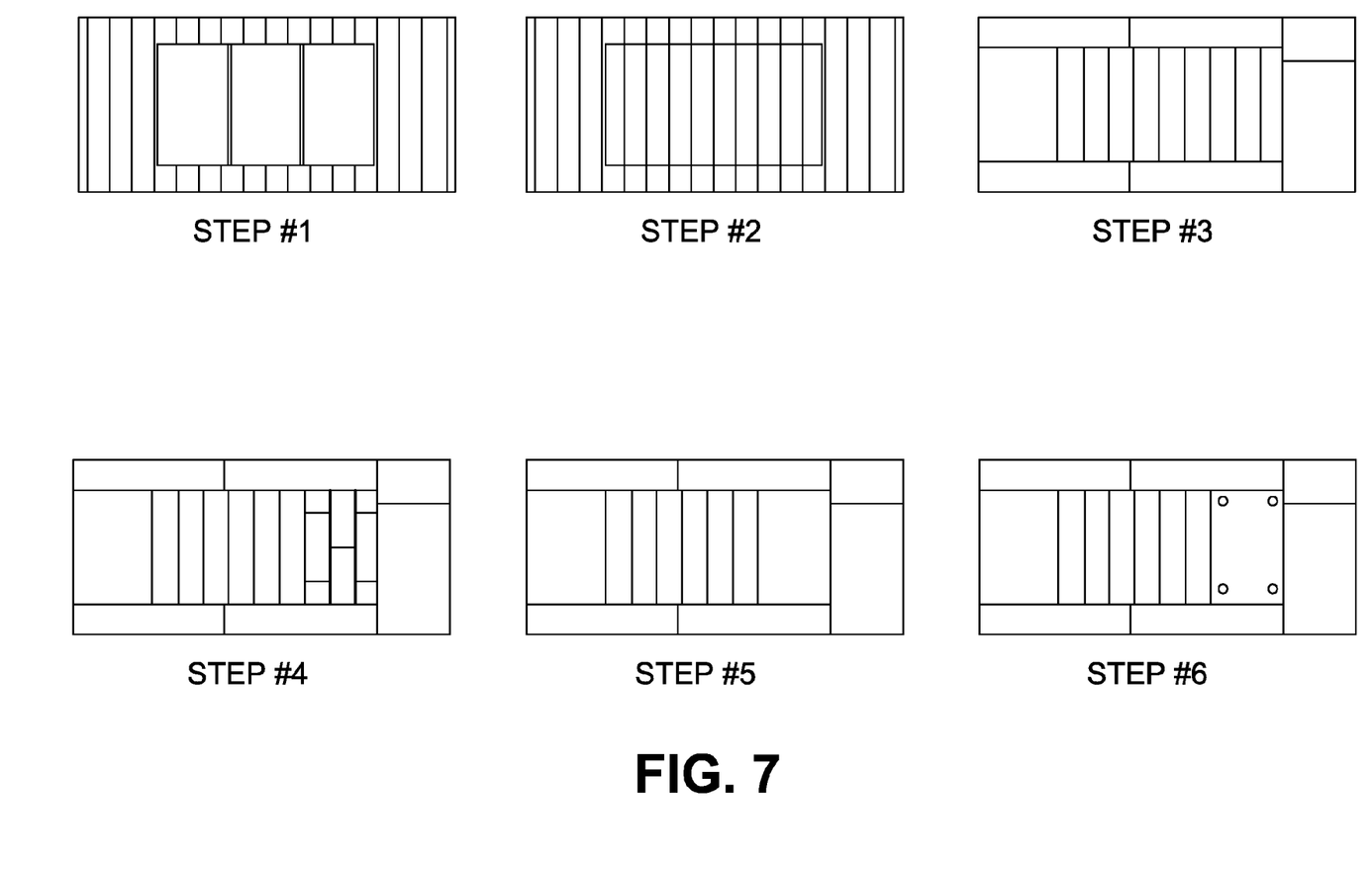
FIG. 7 is a sequence diagram illustrating steps for installing an intermediate roof solar panel on a roof so as to provide an installed roof solar panel, according to the invention.

The inventive method of installation of the subject roof solar panel on a roof is illustrated in FIG. 7. While this illustrates the mounting of three abutting roof solar panels, the process for mounting a single roof solar panel is similar, as will be indicated in the following discussion when appropriate.

Thus, in step 1, the planned configuration of three roof solar panels is shown on a roof section in which the vertical lines represent trusses, a peak of the roof is at the top and bottom edge of the roof is at the bottom. In a shingled installation, the location of the bottom edge of the roof solar panels between the top and bottom of the roof section is preferably at a distance above the bottom edge of the roof section which is approximately a whole multiple of the height (distance from lower to upper edges) of the finished showing surface of a shingle for the roof. This is to provide for a full shingle showing surface in the first row of shingles abutting the lower edge of the recessed outside perimeter ledge 17 along the bottom of the roof solar panel. In Step 2, a border for the roof solar panels is marked, as illustrated, on the trusses to ensure correct positioning of the panels to be mounted. In Step 3, mounting spacers are mounted onto the roof trusses around the marked opening for the roof solar panels. In a shingled installation, or an installation using steel roofing and roof sheathing, the mounting spacers comprise regular roof sheathing, which is mounted onto the trusses around the marked opening for the roof solar panels. If steel roofing is being used without underlying roof sheathing the mounting spacers comprise strapping on the trusses to provide for an adjacent mounting surface which is flush with the recessed outside perimeter ledge 17 of the frame.

In Step 4, in appropriate situations, the installation of roof truss braces 7 to roof trusses that will be under intermediate areas of the first roof solar panel to be installed is shown. Although this is preferably performed after installation of the mounting spacers, the roof truss braces may be installed at any time after the area for mounting the modular roof panel has been selected. In Steps 5 and 6, mounting of the first solar panel is shown. In Step 5 the roof solar panel is placed into position. In Step 6 the roof solar panel is attached to the underlying roof trusses. Preferably, the frame 2 comprises a number of holes for receiving screws to attach the roof solar panel to the underlying roof trusses (as shown in FIGS. 3 and 5). Preferably, after the roof solar panel is in place, a sealing adhesive is applied into each of said holes. A screw is then installed in such holes, beginning with each of the four corners of the roof solar panel, followed by any other such holes, further preferably providing each of such holes with a tapered opening for the screw head. Steps 4-6 are repeated to install the other two roof solar panels.

In Step 7, which shows the other two panels also mounted in position, a resilient strip (15 in FIG. 3), preferably made of acrylic foam, is mounted along the join between abutting roof solar panels. (This is not applicable to when a single roof solar panel is being installed—no such resilient strip is needed in the latter case.) Preferably, the resilient strip 15 is mounted over silicon sealant applied between the respective recessed outside perimeter ledges 17 of adjacent roof solar panels. Also preferably, such resilient strip 15 extend from the lower ends of the upper recessed outside perimeter ledges 17 to the upper ends of the lower recessed outside perimeter ledges 17 (to allow for roof covering to be installed on the upper and lower recessed outside ledges 17 of each of the adjacent roof solar panels).

Steps 8 through 10 detail installation procedures specific to a shingled installation. In Step 8 a preferred method of preparing shingle strips 6 for installation around the outermost sides and top, perimeter areas of the three roof solar panels is shown. (If there is just one roof solar panel, then these shingle strips 6 are for installation around both sides and top perimeter areas of the roof solar panel.) This involves cutting away the normally exposed part of the shingle (i.e. when conventionally installed on a roof) at about one inch below the normal glue line, to leave intact a shingle strip 6 preferably about from 20 to 21 cm high (about 8 inches) i.e. from the lower to upper edge if conventionally orientated. In Step 9 is shown the installation of shingle strips around the top and side perimeter areas of the roof solar panels. Preferably, the glue side of the shingle is mounted on the recessed outside perimeter ledge 17. In multiple solar panel installations employing the resilient strip 15, the shingle strip is cut so as to butt up against a side of the part of the resilient strip 15 that extends to the lower end of the upper recessed outside perimeter ledges 17.

In Step 10, regular shingles 30 and 16a are shown installed from the bottom edge of the roof 25 up to the edge of lower recessed outside perimeter ledge 17 of the frame 2 (best shown in FIGS. 8 and 8a), also configured to butt up against the lower edges of the resilient strips 15. In preparation for installation of the retainer trim 5, preferably silicon sealant is applied around the perimeter areas of all the solar panels, i.e. over the shingle strips 6, the frames 2, photovoltaic panels 3, the resilient strips 15 and the shingles at the bottom adjacent the flashing strip. Also, preferably roof sealer is applied to all butt joints out 2 inches from the solar panel. In Step 11, the retainer trim 5 is mounted in position over the frames 2, shingles 6, photovoltaic panels 3, and, for multiple solar panel installation, resilient strips 15. Fasteners, preferably screws and silicon sealer, are then installed through the retainer trim 5, into the underlying frame 2 (as shown in FIG. 3). Finally, shingling of the roof is performed in which conventional shingles 16a butt up against the retainer strip 5.

In a steel roofing installation the steel roofing would be laid across the roof and mounted on the recessed outside perimeter ledge 17 of the frame 2. The retainer trim 5 would then be mounted as described above.

Figure 8:
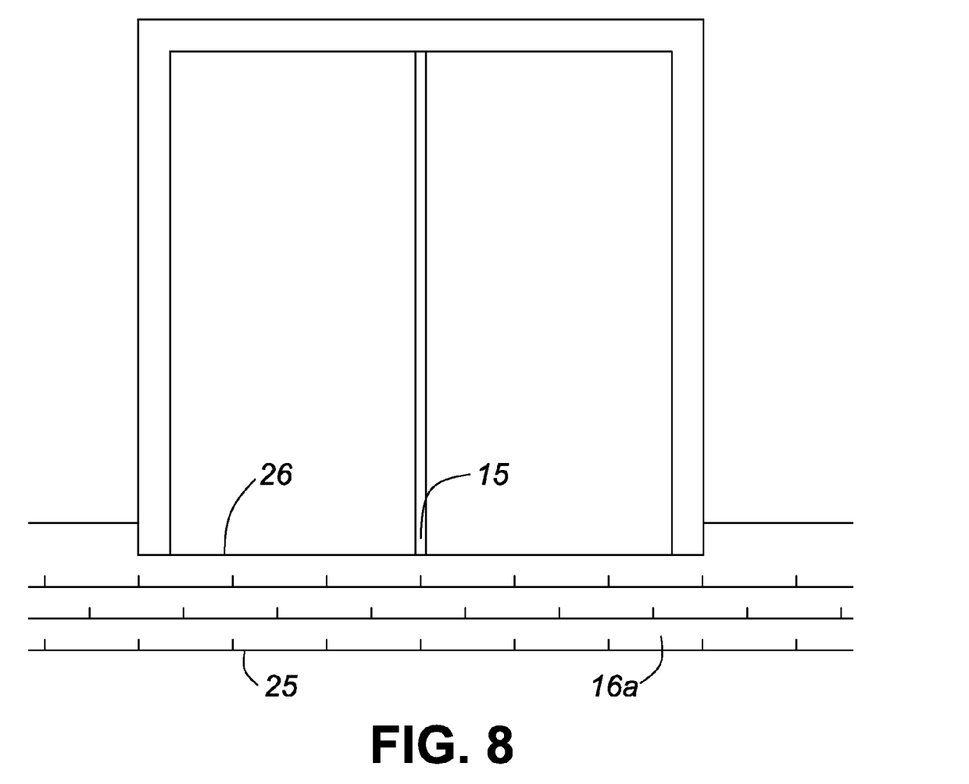
FIG. 8 is a plan view of a pair of adjacent roof solar panels according to the invention, showing particulars of preferred shingle integration along the lower edge of the roof solar panels before installation of the retainer trim component.
Figure 8A:
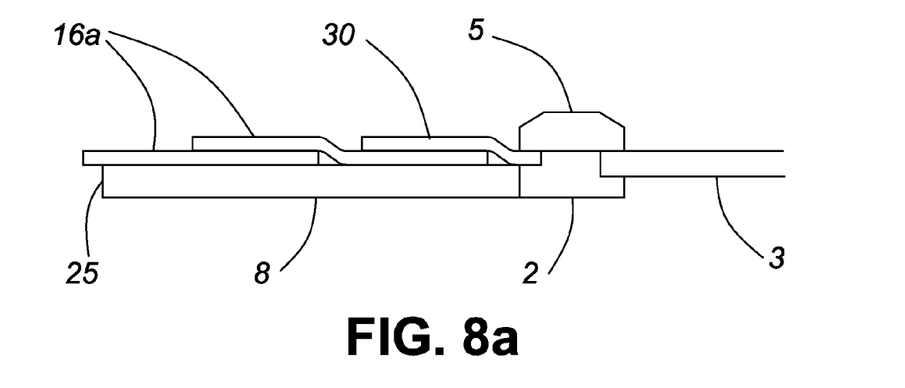
FIG. 8a is a cross section view of the bottom (lower) end of one of the roof solar panels of FIG. 8, after installation of the retainer trim component.

FIG. 8 shows a preferred shingle integration along the lower edge area of a pair of abutting roof solar panels. A normal shingling process is used from the lower edge of the roof 25 upwards to the lower edge of the solar panels 26, the latter of which has been preferably pre-arranged to be located from the former at a distance which is an increment of 6½" from the former. The shingle below said lower end of the resilient strip 15 can be seen between the solar panels where it butts up against said end. In FIG. 8a (which is a schematic representation, not to scale) the lower area of FIG. 8 is shown in cross-section but with the retainer trim 5 in position. The top-most, shingle 30 is configured against the upper edge of the lower recessed outside perimeter ledge 17, beneath the retainer trim 5. The first and second adjacent shingles 16a from the roof edge 25 are also shown.

In a preferred commercial embodiment of the invention, the roof solar panel 9 is prepared to a pre-installation condition without the retainer strip 5 sealed in place. This is because, as may be appreciated from the foregoing description of the installation method, the retainer trim 5 can only be fully installed once the roof covering, and resilient strips 15 if applicable (i.e. for multiple panel installations), have been installed over the recessed outside perimeter ledge 17 of the frame 2 and adjacent sheathing 8, or strapping in the case of a steel roofing installation without an underlying sheathing. Thus, such pre-installation condition of the subject roof solar panel may be sold as such, preferably in kit form with shingle strips 6, roof truss braces 7 and mounting hardware, for later installation on a roof in combination with the retainer trim 5.

While the foregoing describes most preferred embodiments of the subject invention, a person skilled in the art will appreciate that variations of such embodiments will be feasible and, still be within the scope of the teachings herein. Thus, the substitution of different materials (e.g. metals, plastic, adhesives etc.) for those specifically indicated may be expected to occur to such person, and variations in shapes and configurations of the different components involved may be made while sustaining the functions of components actually shown herein, such all being within the intended scope of the present invention.

I claim:

1. A modular roof solar panel for installation on a sloped roof, the solar panel comprising:
    a rigid photovoltaic panel;
    a rectangular frame comprising:
        a width and a lower surface respectively configured for mounting of the solar panel on a plurality of adjacent roof trusses,
        an inside support wherein said photovoltaic panel is mounted on said inside support of the rectangular frame;
        an outside support configured for receiving an overlapping part of a roof covering; and
        a thickness which is about the same as a combined thickness of a roof sheathing and roof covering of an adjacent part of the roof; and
    a retainer trim mounted on top of the frame and overlapping the photovoltaic panel so as to secure said photovoltaic panel on the inside support, and also overlapping the outside support for securing said overlapping part of the roof covering when the modular roof solar panel is installed on a roof.

2. The solar panel of claim 1, wherein the photovoltaic panel is sealingly mounted onto the inside support of the frame using a sealing adhesive.

3. The solar panel of claim 1, wherein the frame and retainer trim are made of aluminum.

4. The solar panel of claim 1, wherein the retainer trim further comprises fasteners for securing the retainer trim to the frame.

5. The solar panel of claim 1, further comprising a spacer between the frame and the retainer trim.

6. The solar panel of claim 1, wherein the outside support is for mounting an overlapping part of a roof covering that is either a shingle or steel roofing.

7. The solar panel of claim 1, wherein when the solar panel is installed on a roof, the retainer trim is sealingly mounted to the frame, photovoltaic panel, and roof covering using a sealing adhesive.

8. The solar panel of claim 1, wherein the inside support, the outside support, or the inside support and the outside support are comprised of a recessed perimeter ledge.

9. A kit of parts for installation of a modular roof solar panel for installation on a sloped roof, said kit comprising:
   a solar panel comprising:
      a rigid photovoltaic panel;
      a rectangular frame comprising:
         a width and a lower surface respectively configured for mounting of the solar panel on a plurality of adjacent roof trusses,
         an inside support, wherein said photovoltaic panel is mounted on said inside support of the rectangular frame;
         an outside support configured, for when the modular roof solar panel is installed on a sloped roof, for mounting of an overlapping part of a roof covering; and
         a thickness which is about the same as a combined thickness of a roof sheathing and roof covering of an adjacent part of the roof;
   a retainer trim for mounting on top of the frame and overlapping the photovoltaic panel so as to secure said photovoltaic panel on the inside support, and also overlapping the outside support for securing said overlapping part of the roof covering when the modular roof solar panel is installed on a roof; one or more roof truss braces; mounting hardware; and one or more shingle strips.

10. A method of installing the modular roof solar panel according to claim 1 onto a sloping roof so as to provide a roof solar panel, said method comprising:
   selecting an area for mounting the modular roof solar panel;
   installing mounting spacers on roof trusses around a perimeter of said area; mounting the solar panel onto the roof trusses of said area;
   securing the roof covering over said outside support and adjacent mounting spacers; and
   mounting the retainer trim on said frame, roof covering and photovoltaic panel.

11. The method of claim 10 further comprising, after selecting the area for mounting the modular roof solar panel, installing roof truss braces between the roof trusses and preparing said roof truss braces for contact with the photovoltaic panel.

12. The method of claim 10 wherein said securing of the roof covering comprises using sealing adhesive on an underside of the roof covering, and wherein said mounting of said retainer trim comprises using sealing adhesive between said retainer trim and each of said frame, roof covering, and photovoltaic panel.

13. The method of claim 10 wherein two or more abutting modular roof solar panels are installed using a connecting strip, and sealing adhesive between the outside supports of abutting sides of said abutting panels.

14. The method of claim 10, wherein the mounting spacers comprise strapping and the roof covering comprises steel roofing.

15. The method of claim 10, wherein the mounting spacers comprise roof sheathing and the roof covering comprises shingles or steel roofing.

16. The method of claim 15, in which the roof covering comprises shingles, further comprising, after mounting of the retainer trim, integrating surrounding shingles on adjacent roof sheathing to said shingles on which said retainer trim has been mounted.

17. The method of claim 15, in which the roof covering comprises shingles, wherein some of said shingles are shingle strips, said shingle strips being secured onto said outside support along both lateral sides and top side of the frame of the modular roof solar panel, and wherein other of said shingles are shingles secured onto said outside support along a bottom side of the frame of the modular roof solar panel such that top edges of said other shingles abut against an inside edge of said outside support.

18. The method of claim 17 wherein said shingle strips are prepared from shingles by cutting away at least part of a showing surface of said shingles.

19. A roof solar panel system comprising:
   a rigid photovoltaic panel;
   a roof having a plurality of roof trusses, a roof covering and a roof sheathing;
   a rectangular frame comprising:
      a width and a lower surface mounting the photovoltaic panel on the plurality of roof trusses,
      an inside support receiving the photovoltaic panel;
      an outside support receiving an overlapping part of a roof covering; and
      a thickness which is about the same as a combined thickness of the roof sheathing and the roof covering; and
      a retainer trim mounted on top of the frame and overlapping the solar panel to secure the solar panel on the inside support, the trim overlapping the outside support for securing the roof covering on the outside support.

* * * * *